(12) United States Patent
Grewe et al.

(10) Patent No.: US 9,387,937 B2
(45) Date of Patent: Jul. 12, 2016

(54) EJECTION DEVICE FOR A FLIGHT DATA RECORDER

(75) Inventors: Reinhold Grewe, Uhldingen-Muehlhofen (DE); Stefan Feierabend, Friedrichshafen (DE)

(73) Assignee: Airbus Defence and Space GmbH, Ottobrunn (DE)

(*) Notice: Subject to any disclaimer, the term of this patent is extended or adjusted under 35 U.S.C. 154(b) by 479 days.

(21) Appl. No.: 13/805,270

(22) PCT Filed: Jun. 16, 2011

(86) PCT No.: PCT/DE2011/001361
§ 371 (c)(1),
(2), (4) Date: Dec. 18, 2012

(87) PCT Pub. No.: WO2011/157265
PCT Pub. Date: Dec. 22, 2011

(65) Prior Publication Data
US 2013/0092795 A1   Apr. 18, 2013

(30) Foreign Application Priority Data

Jun. 19, 2010   (DE) .......................... 10 2010 024 400

(51) Int. Cl.
*F16B 7/20* (2006.01)
*B25G 3/16* (2006.01)
(Continued)

(52) U.S. Cl.
CPC ................ *B64D 45/00* (2013.01); *B64D 25/20* (2013.01); *B64D 2045/0065* (2013.01); *Y10T 403/22* (2015.01); *Y10T 403/592* (2015.01); *Y10T 403/7007* (2015.01)

(58) Field of Classification Search
CPC ........... B64D 25/20; B64D 2045/0065; B64D 45/00; Y10T 403/7007; Y10T 403/7005
USPC ...... 403/15, 31, 109.2, 322.2, DIG. 3, DIG. 4
See application file for complete search history.

(56) References Cited

U.S. PATENT DOCUMENTS 1,318,197 A    10/1919  Erickson
2,778,332 A *   1/1957  Talbot ........................... 116/210
(Continued)

FOREIGN PATENT DOCUMENTS

BE         635 772 A     2/1964
DE       1 481 960 A1    6/1969
(Continued)

OTHER PUBLICATIONS

Explosives Storage, "Storage of airbag and belt tensioner units SprengLR 240", Jul. 23 1997, Federal Labour Gazette No. 09/97, including machine-generated English translation (nine (9) pages).

*Primary Examiner* — Michael P Ferguson
*Assistant Examiner* — Matthew R McMahon
(74) *Attorney, Agent, or Firm* — Crowell & Moring LLP

(57) ABSTRACT

An ejection device for a flight data recorder includes an ejection spindle, which can be detachably connected to the flight data recorder by means of a bayonet coupling. The bayonet coupling can be released by means of force application by the ejection spindle, a disengaging device, which has a compression-resistant housing and into which the ejection spindle can be screwed, and a gas pressure generator, a valve, which is located within the disengaging device and which permits a flow connection between the outlet of the gas pressure generator and the ejection spindle when the ejection spindle is screwed in and which disables the flow connection between the outlet of the gas pressure generator and the ejection spindle when the ejection spindle is unscrewed.

2 Claims, 2 Drawing Sheets

(51) Int. Cl.
 *B64D 45/00* (2006.01)
 *B64D 25/20* (2006.01)

(56) References Cited

U.S. PATENT DOCUMENTS

| | | | | |
|---|---|---|---|---|
| 3,017,907 A | * | 1/1962 | Quail et al. | 141/197 |
| 3,140,847 A | | 7/1964 | Ames, Jr. | |
| 3,181,809 A | * | 5/1965 | Lobelle | 244/1 R |
| 4,002,120 A | * | 1/1977 | Swales et al. | 102/378 |
| 4,101,098 A | * | 7/1978 | Hickle | 244/63 |
| 4,175,392 A | * | 11/1979 | Morimoto | 60/561 |
| 4,187,759 A | * | 2/1980 | Toy et al. | 89/1.14 |
| 4,636,135 A | * | 1/1987 | Bancon | 414/730 |
| 4,929,135 A | * | 5/1990 | Delarue et al. | 411/354 |
| 5,411,350 A | * | 5/1995 | Breault | 403/350 |
| 5,692,851 A | * | 12/1997 | Pace | 403/31 |
| 5,758,700 A | * | 6/1998 | Vanderploeg | 141/347 |
| 6,161,826 A | * | 12/2000 | Forrer | 269/309 |
| 6,322,276 B1 | * | 11/2001 | Liu | 403/31 |
| 6,390,722 B1 | * | 5/2002 | Godfrey et al. | 403/322.2 |
| 6,485,214 B2 | * | 11/2002 | Schill | 403/13 |
| 6,758,142 B1 | * | 7/2004 | Seaquist | 102/377 |
| 7,963,717 B2 | * | 6/2011 | Seger | 403/322.2 |
| 8,493,715 B1 | * | 7/2013 | Angelucci | 361/679.01 |

FOREIGN PATENT DOCUMENTS

| | | |
|---|---|---|
| DE | 196 09 501 C2 | 2/2000 |
| DE | 198 48 801 C2 | 10/2003 |
| GB | 1288076 * | 9/1972 |
| GB | 1 318 197 A | 5/1973 |

* cited by examiner

EJECTION DEVICE FOR A FLIGHT DATA RECORDER

BACKGROUND AND SUMMARY OF THE INVENTION

Exemplary embodiments of the present invention relate to an ejection device for separating an ejectable flight data recorder, for example, from an aircraft cell.

In conventional ejectable flight data recorders explosive cartridges, explosive screw bolts or squibs are used in order to separate the connection between the ejectable part and the ejection device of the flight data recorder system. This method is extremely operationally safe and reliable because very few electrical, mechanical and chemical components are involved in functionality.

Handling the explosive substances required for this purpose has been burdened in the last ten years with stringent conditions with regard to dispatch, storage and installation. This leads to high costs for the use or exchange of the respective components and to a decrease in readiness of aircraft manufacturers or aircraft operators to integrate such parts in or on an aircraft.

GB 1,318,197 describes an ejection device for a flight data recorder in which the flight data recorder is ejected by means of a gas pressure generator. The gas pressure generator acts upon a pressure chamber, the internal pressure of which, in turn, acts directly upon the housing of the flight data recorder. A further ejection device operated by gas pressure is disclosed in German Patent Document DE 198 48 801 C2.

German Patent Document DE 196 09 501 C2 uses a catapult device with an explosive charge in order to eject the flight data recorder, while a rocket is proposed for this purpose in U.S. Pat. No. 3,140,847.

Exemplary embodiments of the present invention are direct to an ejection device for a flight data recorder that places no demands in terms of dispatch, storage and installation upon specially trained personnel for the handling of explosive substances:

No or only minor restrictions in the dispatch of the parts;
the parts are to be transportable in large quantities, unprotected, in a crate, without special "separation instructions", by regular mail services (for example, UPS);
the parts are to be depositable in a store without special safety requirements;
the installation of the parts in the ejection device is to be possible by service personnel requiring no special permit for handling explosive substances.

The device according to the invention fulfills all the requirements described above because
no explosive substances of any kind are used,
all effects of unintentional triggering have no harmful effects (such as, for example, mechanical bolts/screws shooting out or the action of heat) upon people or objects located outside the device,
the energy required for separating an ejectable flight data recorder is, in the event of a fault, absorbed and nullified inside the device or diverted harmlessly.

Furthermore, the device according to the invention is designed in such a way that even serious mechanical effects caused by accidents or improper use cannot cause the ejection device to be functionally impaired or damaged.

The device according to the invention can be produced cost-effectively and its purchase price does not deviate appreciably from that of a conventional explosive cartridge.

BRIEF DESCRIPTION OF THE DRAWING FIGURES

The invention is explained in more detail by means of figures in which.

DETAILED DESCRIPTION

Figure 1:
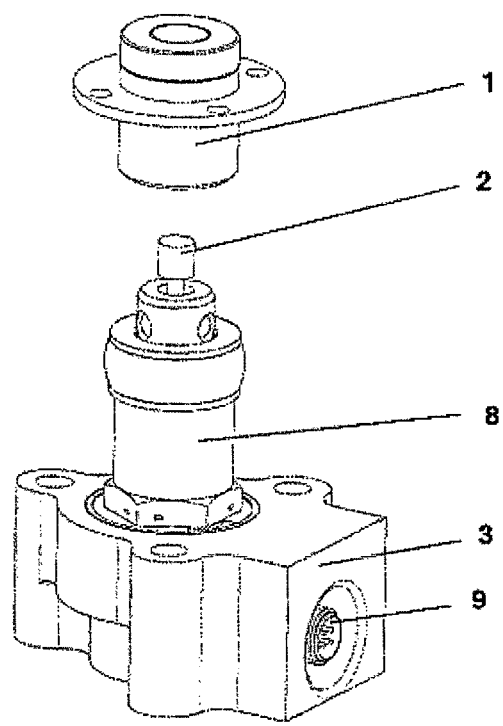
FIG. 1 shows an ejection device according to the invention with a mounted ejection spindle and with a released bayonet fastening in a 3D illustration.

Basic Structure of the Ejection Device (FIG. 1)

The ejection device according to the invention, as illustrated by way of example in FIG. 1, comprises a disengagement device 3 preferably composed of a contour-milled, pressure-resistant aluminum housing into which an ejection spindle 8 can be screwed. The ejection spindle 8 makes, via a bayonet fastening 1, the connection with the ejectable flight data recorder (not illustrated). By the bayonet fastening 1 being released by means of the ejection spindle 8, the ejectable flight data recorder is separated off. Separation is initiated by an electrical pulse to the gas pressure generator 4 integrated in the disengagement device 3 (see FIG. 2).

Figure 2:
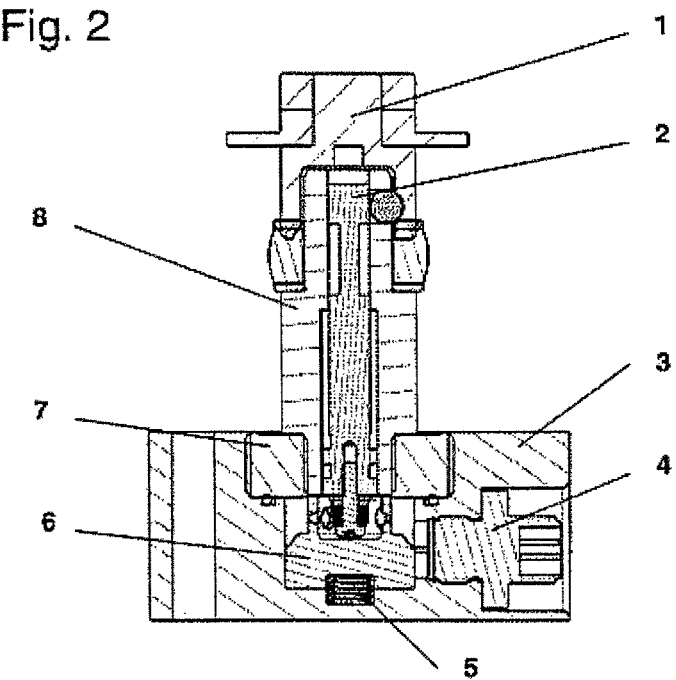
FIG. 2 shows an ejection device according to the invention with a mounted ejection spindle and with a closed bayonet fastening in a cross-sectional illustration.

Installation of the Ejection Spindle in the Disengagement Device (FIG. 2)

The ejection spindle 8 is screwed with its thread into the threaded insert 7 incorporated in the disengagement device 3. In this case, the valve 6, which is prestressed in the disengagement device by a spring 5, is displaced in the direction of its operating position illustrated in FIG. 2. The ejection spindle 8 is screwed as far as it will go into the disengagement device 3. The valve 6 thereby reaches its operating position. In the operating position, in the event of ejection, the gas pressure generated by the gas pressure generator 4 can reach the ejection spindle 8.

Mounting of the Ejectable Flight Data Recorder (FIG. 2)

The ejectable flight data recorder is placed onto the ejection spindle 8 with the aid of the bayonet fastening 1.

Figure 3:
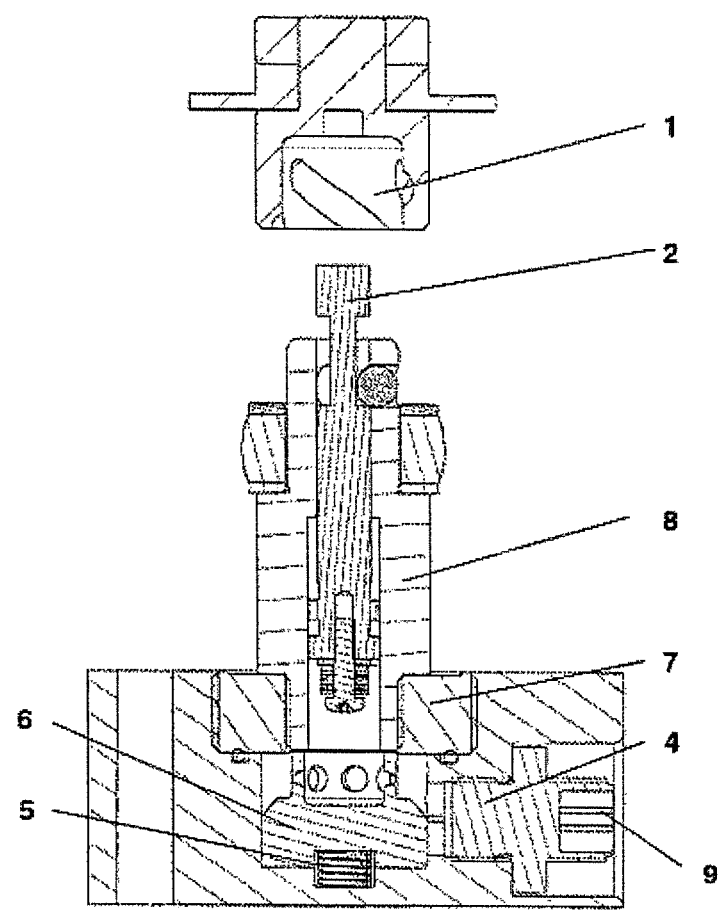
FIG. 3 shows an ejection device according to the invention with a mounted ejection spindle and with a released bayonet fastening in a cross-sectional illustration.

Triggering of the Ejection Device (FIG. 3)

With the ejection spindle 8 screwed completely into the disengagement device 3 and with the valve 6 thereby being brought into the operating position, a pressure-resistant flow connection is made between the gas pressure generator 4 and the ejection spindle 8. In the event of ejection, an electrical pulse is conducted via the plug 9 to the gas pressure generator 4, and the gas pressure generated thereupon by the gas pressure generator arrives at the ejection spindle 8 via the valve 6. In this case, the spindle rod 2 guided in the ejection spindle is displaced by the gas pressure in the direction of the bayonet fastening 1 of the ejectable flight data recorder and thereby opens the bayonet fastening 1. As a result, the ejectable flight data recorder is separated from the ejection device and can be removed from the aircraft.

Figure 4:
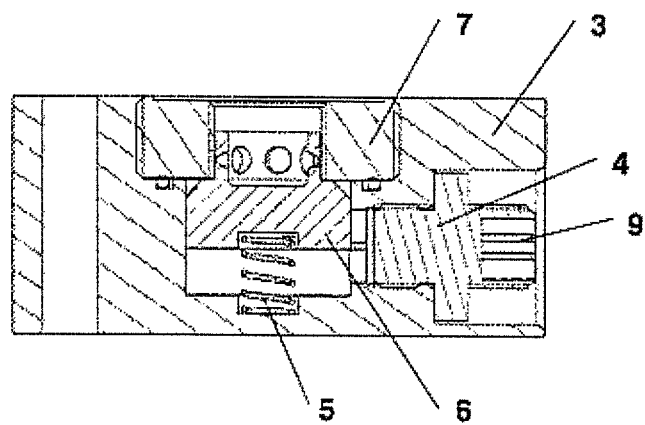
FIG. 4 shows the disengagement device of the ejection device according to the invention, with the ejection spindle not mounted, in a cross-sectional illustration.

Triggering of the Disengagement Device when the Ejectable Flight Data Recorder is not Mounted (FIG. 4)

This situation constitutes a fault caused by:
improper use when the disengagement device 3 is put into electrical operation, for example an ignition device is connected to the disengagement device 3 and is actuated, even though no ejection spindle is mounted.

When an intact disengagement device is exposed to fire for a comparatively lengthy period of time.

FIG. 4 shows a disengagement device 3 with the ejection spindle not mounted. In such a situation, the disengagement device 3 behaves as follows:

Under the action of the spring 5, the valve 6 is then pressed onto the threaded insert 7. In the case of electrical ignition of the gas pressure generator 4 or high thermal action upon the gas pressure generator 4, the gas pressure generated by the gas pressure generator is discharged via the valve 6 into the inner space of the disengagement device 3. A direct, rapid escape of gas from the disengagement device is prevented by the valve 6 which is then seated on the threaded insert 7.

The compressed gas, cooled to the housing temperature, is discharged very slowly via deliberate, minimal leaks between the valve 6 and threaded insert 7. Since the valve 6 (prestressed by the spring 5) remains in position, the triggering of the gas pressure generator has no mechanical effect outside the disengagement device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An ejection device for a flight data recorder, the ejection device comprising:
an ejection spindle comprising an ejection rod, the ejection rod movably received within a central cavity of the ejection spindle, the ejection rod having a recess in an outer surface thereof and a movable locking element engaging the outer surface and movable between a locking position and an unlocking position, wherein in the unlocking position the movable locking element is received within the recess;
a bayonet connection, wherein the ejection spindle is configured to be releasably connected to the flight data recorder via the bayonet connection through engagement of the bayonet connection with the movable locking element when the movable locking element is in the locking position, wherein the bayonet connection is configured to be released upon movement of the ejection rod such that the movable locking element moves into the recess of the ejection rod and thereby disengages from the bayonet fastening;
a disengagement device having a gas pressure generator and a pressure-resistant housing, wherein the ejection spindle is screwable into the disengagement device; and
a moveable valve arranged inside the disengagement device, the valve being configured to assume a first operating position when the ejection spindle is screwed into the disengagement device and to assume a second operating position when the ejection spindle is not screwed into the disengagement device, wherein the moveable valve is spring biased towards the second operating position,
wherein the first operating position permits a flow connection between an outlet of the gas pressure generator and the ejection spindle, and
wherein the second operating position prevents the flow connection between the outlet of the gas pressure generator and the ejection spindle;
wherein, when the valve is in the first operating position, the ejection rod of the ejection spindle is movable by gas pressure upon actuation of the gas pressure generator to move the locking element from the locked position and the unlocked position.

2. The ejection device as claimed in claim 1, wherein the valve is configured to be prestressed by the ejection spindle being screwed into the disengagement device.

* * * * *